June 28, 1932.        M. M. MUNK        1,864,848

AIRCRAFT PROPELLER

Filed Dec. 17, 1930    2 Sheets-Sheet 1

Inventor

Max M. Munk.

By O Boyle and Norton

Attorneys

June 28, 1932.  M. M. MUNK  1,864,848
AIRCRAFT PROPELLER
Filed Dec. 17, 1930  2 Sheets-Sheet 2
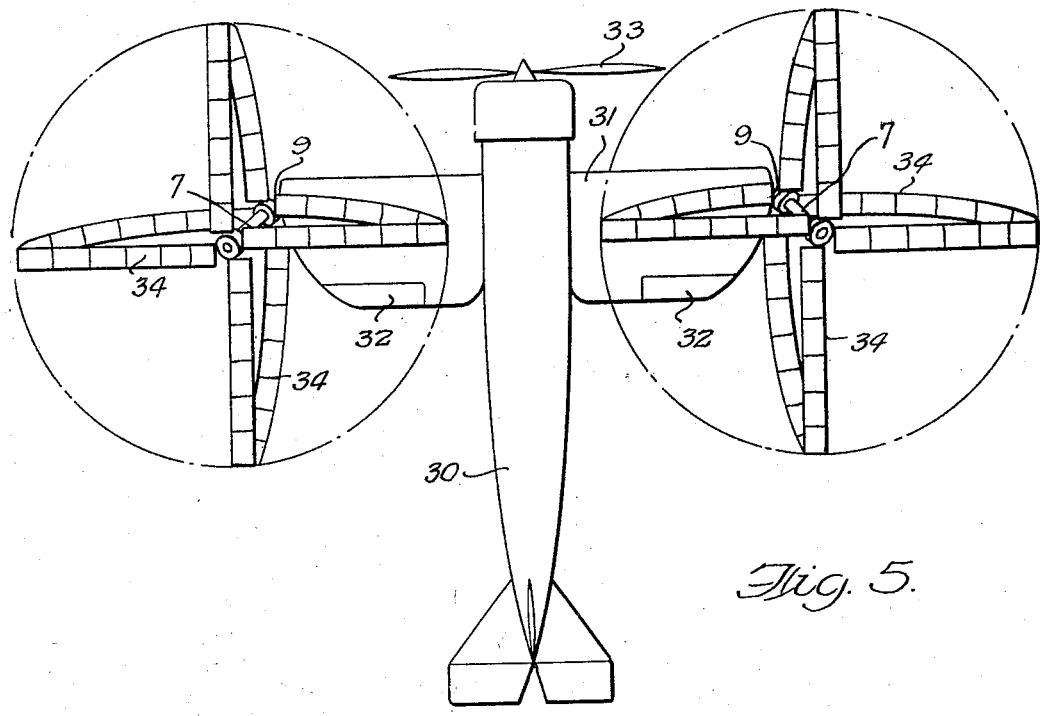
Fig. 5.
Fig. 6.
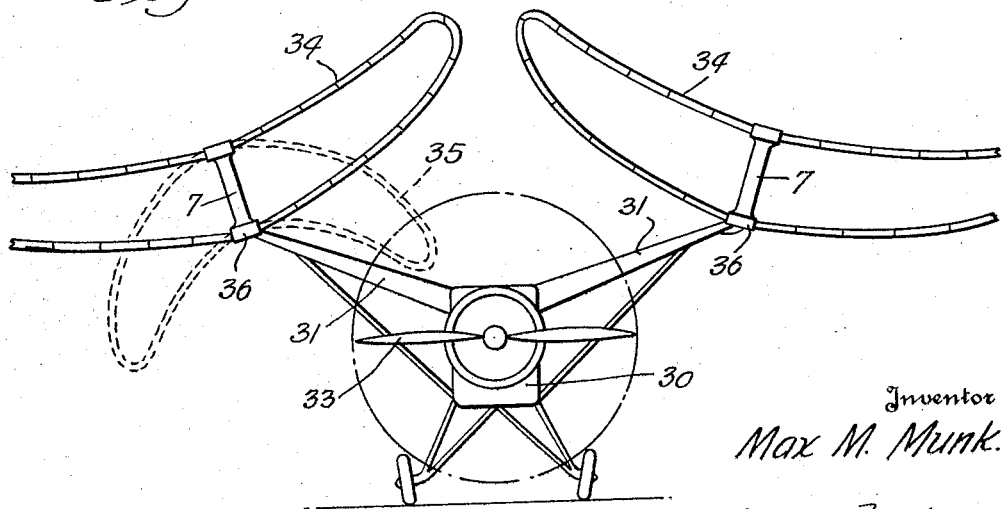
Inventor
Max M. Munk.
By O Bayle as Norton
Attorneys Patented June 28, 1932

1,864,848

UNITED STATES PATENT OFFICE

MAX M. MUNK, OF WASHINGTON, DISTRICT OF COLUMBIA

AIRCRAFT PROPELLER

Application filed December 17, 1930. Serial No. 503,040.

This invention relates to improvements in aircraft propellers and more particularly to a self-adjusting propeller.

The invention has particular reference to the improvement of propellers which are either driven by any suitable motive power such as the engine of an airplane or which may be driven by the reaction of the air striking them as in machines of the autogyro type, and the invention, as will be more particularly described hereinafter, will be set forth with particular reference to this latter type of use. A special feature of the novel improvements of the present invention is the utilization of centrifugal force for maintaining a desired shape of the propeller elements.

It has previously been proposed to use propellers adapted to be centrifugally maintained in a desired shape by providing canvas structures kept tight by means of weights inserted near the tip of the blades. Such weighted propellers were also proposed for lifting purposes, being then provided with blades of suitable or conventional streamlined cross section. Canvas propellers were soon abandoned on account of their low efficiency, and the flexible streamlined lifting propellers were never susceptible of practical use due to the fact that means were lacking for securing a suitable angular position of the blades relative to the plane of rotation and also due to lack of means for securing this plane of rotation in a suitable position relative to the propeller axis.

It is an object of this invention to provide an improved propeller having a plurality of self-adjusting segments or blades.

It is a further object of this invention to provide such an improved propeller comprising a plurality of looped blades.

It is another object of this invention to provide an improved looped blade for aircraft propellers which blades include self-adjusting cambered airfoil segments.

Still a further object of this invention is the provision of an improved aircraft propeller comprising a plurality of looped segmented airfoil members.

Yet another object of this invention is the provision of a looped flexible streamlined propeller.

Yet a further object of this invention is the provision of a centrifugally operated aircraft propeller including looped airfoil members of segmental construction mutually and automatically adjustable and carried by semi-rigid supporting members.

Another object of this invention is the provision of improved means for supporting centrifugally actuated flexible looped airfoils.

A further object of this invention is the provision of an improved airplane having a decreased wing spread and provided with a plurality of self-adjusting looped flexible lifting propellers.

These and other desirable objects and advantages of the present invention will be described in the accompanying specification and illustrated in the drawings, certain preferred embodiments being described by way of illustration only, for, since the underlying principles may be incorporated in other specific mechanical constructions, it is not intended to be limited to the ones here shown, except as such limitations are clearly imposed by the appended claims.

In the drawings like numerals refer to similar parts throughout the several views, of which Fig. 1 is a perspective view of an improved looped and segmented airfoil;

Fig. 5 is a top plan view of an airplane provided with two lifting propellers of the type herein described, and Fig. 6 is a front elevation of the structure shown in Fig. 5.

Figure 1:
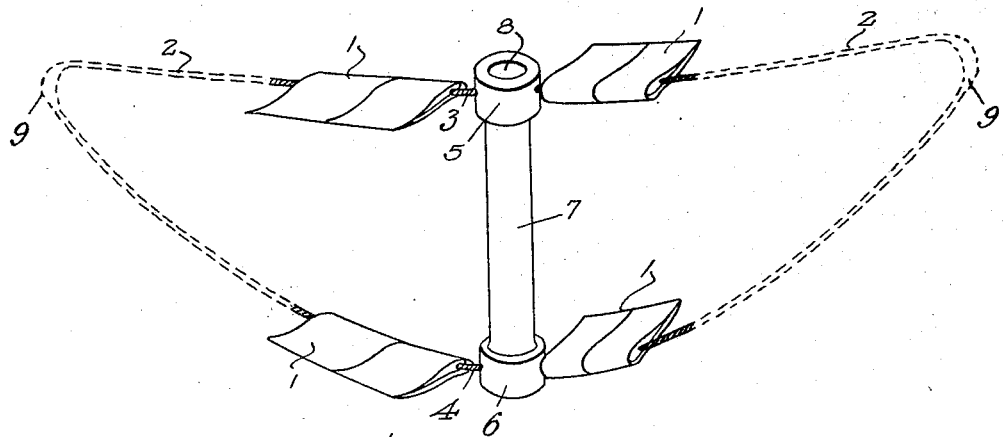

Referring now to the drawings, there is shown in Fig. 1 a novel propeller member comprising a plurality of blade elements, 1, mounted on a semi-rigid cable 2, which cable is secured at its ends 3, 4, to bosses 5, 6, of hub member 7. The hub 7 is provided with the usual center aperture 8 adapted to fit on a propeller mast or shaft 9, as will be described more in detail hereinafter.

The members 2 may comprise suitable cables or ropes of metal or fibre, or a combination of these, which, due to their inherent stiffness, prevent their being wound around the hub 7 upon rotation, this stiffness being further increased by the members 1 as will be described more in detail hereinafter. The members 2 may also be made of chains, the members being, if desired, formed to limit their flexibility.

As intimated hereinbefore, the supports 2 are bent back on themselves and secured at their ends 3 and 4 to the bosses 5 and 6 of the hubs, the points of attachment 3 and 4, being in the same longitudinal plane and on the same side of the hub. This construction insures a further stiffening of the airfoil segments. Where it is desired to use light weight cables or supporting members the extremities of the loops may be weighted, as indicated generally at 9, Fig. 1, in order to secure the maximum centrifugal moment of the rotating system.

The airfoils or propeller sections, as already intimated, comprise segments, 1, having cambered top and bottom portions 10, 11, respectively, together with streamlined leading edges 12 and an uptilted or bent trailing edge 13. The members 1 are freely rotatable upon the supports 2, the cable passing through the said members parallel to the leading edges and subjacent to the crown of the airfoil segment or top camber of the leading edge.

Figures 2, 3:
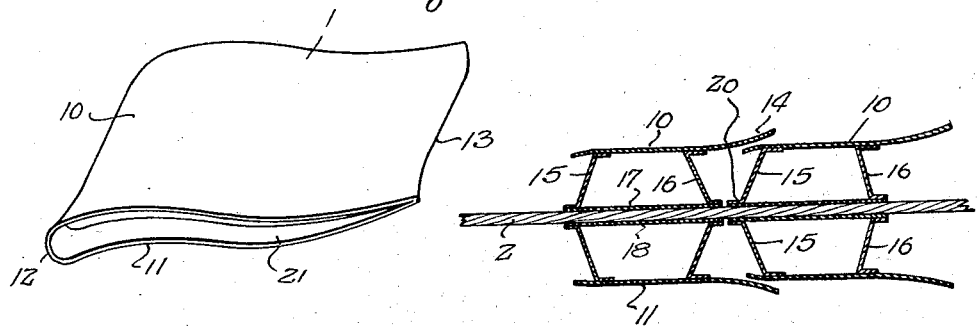
Fig. 2 is a perspective view of a propeller segment taken at right angles to the propeller axis.
Fig. 3 is a fragmentary vertical section through a portion of a propeller blade substantially at right angles to the propeller axis.

The blade elements 1, as noted, are freely rotatable with respect to the support 2 and are held in proper angular position by the reaction of the air. To assure this condition they are streamlined in a novel way, the trailing edges 13 being bent upwardly at a distinct angle as shown in Figs. 1 and 2. It has been discovered that the airfoil segments herein disclosed having bent up trailing edges automatically assume an efficient position relative to the air current reacting therewith provided that the said elements are properly pivoted. The use of such cross sections eliminates the necessity of providing for special stabilizing surfaces or structures attached to each individual blade element or airfoil segment.

Figure 4:
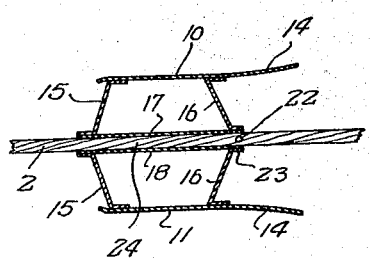
Fig. 4 is a view similar to Fig. 3 showing means of securing an airfoil segment to the common support.

The shape of the segments is such as to permit a limited bending of the cable or support, the several segments being provided with overlapping lateral skirt or cover portions 14, which permit the nesting of the abutted segments. These segments, as shown more particularly in Figs. 3 and 4, are provided with lateral members 15, 16, which are bent toward each other so as to form a pair of inverted trapezoids having their respective bases 17 and 18 coincident with the supporting member 2. A plurality of such segments are abutted together or strung along the support 2 and permit a limited flexing of the airfoil surface. As already pointed out the outside covers or skirt portions, 14, of the respective segments overlie the surfaces of the respective abutting elements whereby to approach a continuity of such surfaces.

The airfoil segments may be provided with a plurality of transverse apertures 21 extending parallel to the supporting member 2. This construction permits an appreciable lightening of the airfoil members without decreasing their structural efficiency. If the members are made of laminated wood covered with suitable fabric and airplane dope compositions, any suitable number of apertures may be provided to reduce the unit weight within limits, however, so as to not affect the structural efficiency of the member. Phenolic condensation products such as bakelite or the like may be used; micarta, which is the mixture of mica and phenol condensation products being suitable. Laminated fabric impregnated with bakelite may also be used. Where such moldable condensation products are used the members may be formed directly in a single molding operation, a distinct advantage of this type of construction being the fact that the members so fabricated are of uniform construction and weight. The skirt members 14 may be formed integrally with the body of the segments or they may comprise sheet members conformed to the segments and secured by any suitable adhesive or by mechanical means such as rivets.

The airfoil members above described may also be made of any suitable metal such as the light weight magnesium-aluminum alloys known as magnalium or other aluminum alloys known as duralumin or dural. A particular advantage of the use of sheet metal materials suitably configured and welded, brazed or riveted together, resides in the lightness of the assembly due to the use of the hollow airfoil segments. In addition, further advantages are possible due to the fact that such materials as dural are susceptible of heat treatment whereby the strength of the materials is greatly increased.

The segments which, as noted above, are strung on the supporting cable 2 in any suitable manner, being abutted as indicated in Fig. 3 and freely movable along the cable. The various segments are thus held together and abutted against the hubs 5 and 6 and the ends of the loop by virtue of their number. However, the invention comprehends the attachment or securing of these members directly to the cables as by means of rivets, indicated generally at 22, although clamps may be applied over the extensions 23 of member 16 and in such manner as to cause the latter to grip the supports 2. With such a construction the flexibility of the system relies on the torsional flexibility of the support 2 for the self-adjustment caused by the varying angle of attack during rotation.

The looped supports 2 are, as disclosed above, secured to the hubs 7 at the bosses 5 and 6 respectively and are so secured as to make the connections 3 and 4 substantially rigid in order to prevent any whipping of the members about the hubs upon rotation. While the supporting members have been shown as fastened to a unitary support or hub 7 having a pair of integral bosses 5 and 6 it will of course be appreciated that the members 5 and 6 may be freely rotatable with respect to each other and spaced apart by a support bushing, the whole assembly being mounted on a suitable mast or shaft.

Referring now to Figs. 5 and 6 there is shown an airplane having a fuselage 30, wing structure 31, and airfoils 32. A propeller 33 is mounted at the nose of the fuselage and is adapted to be driven by any suitable power source, not shown. Mounted at either end of the wings 32, are masts or shafts 9 about which the hub 7 and associated looped airfoils 34 are adapted to rotate. The masts are so positioned with respect to their associated airfoils 34 and the propeller 33 that the latter may function at all times, even though the members 34 may be in a collapsed condition as indicated generally at 35 in Fig. 6. To secure this collapsed condition of the lifting members a suitable braking mechanism or clutch, indicated generally at 36, and controlled by the operator of the machine, may be actuated to hold the lifting propellers from rotation.

While the improved propellers of the present invention have been described with particular reference to their use as freely rotatable lifting propellers adapted for permitting substantially vertical descent, the invention also comprehends the utilization of suitable power mechanism connected to the said elements whereby to permit their use as lifting propellers where it is desired to raise the machine vertically from the ground. Any desired number of opposed elements or segmented airfoil assemblies may be used in order to secure the desired results.

It will now be appreciated that there has been disclosed an improved aircraft propeller which is self-adjusting so as to present the most favorable angle of attack under all operative circumstances and which is characterized by a plurality of flexible members, the said propellers being particularly adapted for use as lifting propellers for aircraft and by virtue of their lightness and greatly improved efficiency, being adapted to permit substantial decreases in wing area or span of airplanes while retaining the desirable efficiency of a long wing span.

What is claimed is:

1. A looped propeller which is self-adjustable by torsional flexion.
2. A segimental looped propeller.
3. A self-adjusting segmental looped propeller.
4. A doubly concave looped propeller.
5. A self-adjusting doubly concave segmented looped propeller.
6. An improved propeller including a hub, a looped tension member secured at its ends to the hub, and a plurality of self-adjusting streamlined airfoil segments mounted on said tension member.
7. An improved propeller including a hub, a looped tension member secured at its ends to the hub, and a plurality of respectively abutting self-adjusting streamlined airfoil segments mounted on said tension member.
8. A rotatively mounted propeller comprising a hub and a plurality of blade segments freely rotatable with respect to their longitudinal direction, the trailing edge of the cross section being bent up in direction of the air force.
9. An improved propeller including a hub, a plurality of looped tension members secured at their ends to the hub, and a plurality of self-adjusting streamlined airfoil segments mounted on said tension members.
10. An improved propeller including a hub, a plurality of opposed looped tension members secured at their ends to the hub, and a plurality of self-adjusting streamlined airfoil segments mounted on said tension members.
11. An improved propeller including a hub, a plurality of equi-spaced looped tension members secured at their ends to the hub, and a plurality of self-adjusting streamlined airfoil segments mounted on said tension members.

In testimony whereof I affix my signature.

MAX M. MUNK.